(12) United States Patent
Šterba et al.

(10) Patent No.: US 12,368,739 B2
(45) Date of Patent: Jul. 22, 2025

(54) ADAPTIVE NETWORK ATTACK PREDICTION SYSTEM

(71) Applicant: Oracle International Corporation, Redwood Shores, CA (US)

(72) Inventors: Ján Šterba, Bratislava (SK); Venkatakrishnan Gopalakrishnan, Ontario (CA); May Bich Nhi Lam, San Jose, CA (US); Yunjiao Xue, Ontario (CA); Nana Lei, San Francisco, CA (US); Edward C. Cheng, South San Francisco, CA (US); Hayward Ivan Craig Welcher, Waterloo (CA); Jacob Becker West, San Francisco, CA (US); Qi Wen Cao, Ontario (CA)

(73) Assignee: Oracle International Corporation, Redwood Shores, CA (US)

( * ) Notice: Subject to any disclaimer, the term of this patent is extended or adjusted under 35 U.S.C. 154(b) by 822 days.

(21) Appl. No.: 17/450,801

(22) Filed: Oct. 13, 2021

(65) Prior Publication Data

US 2023/0141928 A1 May 11, 2023

(51) Int. Cl.
*H04L 29/06* (2006.01)
*G06N 20/00* (2019.01)
*H04L 9/40* (2022.01)

(52) U.S. Cl.
CPC ......... *H04L 63/1425* (2013.01); *G06N 20/00* (2019.01); *H04L 63/1416* (2013.01); *H04L 63/1433* (2013.01); *H04L 63/1441* (2013.01); *H04L 63/1466* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 10,356,117 B2 | 7/2019 | Brabec et al. | |
| 11,093,833 B1 | 8/2021 | Gardner et al. | |
| 11,915,105 B2 * | 2/2024 | Steingrimsson | ........ C22C 19/05 |
| 2016/0088000 A1 | 3/2016 | Siva Kumar et al. | |
| 2017/0085588 A1 * | 3/2017 | Laidlaw | ............. H04L 63/1425 |
| 2017/0093910 A1 * | 3/2017 | Gukal | ................. H04L 63/1491 |
| 2018/0013772 A1 | 1/2018 | Schmidtler et al. | |

(Continued)

OTHER PUBLICATIONS

Marcio Guia et al., "Comparison of Naive Bayes, Support Vector Machine, Decision Trees and Random Forest on Sentiment Analysis", pp. 525-531, 2019 (Year: 2019).

*Primary Examiner* — Jeffery L Williams
(74) *Attorney, Agent, or Firm* — Invoke

(57) ABSTRACT

Machine-learning (ML) techniques and models are described for predicting the number and severity of network attacks within a specified timeframe, such as the next fifteen minutes. In some embodiments, the techniques including training a ML model based on features extracted from a training dataset and applying the trained ML model to estimate (a) the probability of an attack happening on an account within a specified timeframe; (b) how many attacks are predicted to occur in the specified timeframe (if any); and/or (c) the severity of the attacks predicted to occur. A system may deploy preventative measures based on the ML model output to counter or mitigate the effects of predicted and coordinated network attacks.

20 Claims, 8 Drawing Sheets

(56) References Cited

U.S. PATENT DOCUMENTS

| | | | |
|---|---|---|---|
| 2018/0069867 A1* | 3/2018 | Grajek | G06N 7/00 |
| 2018/0375886 A1* | 12/2018 | Kirti | H04L 63/104 |
| 2019/0020670 A1 | 1/2019 | Brabec et al. | |
| 2019/0095320 A1* | 3/2019 | Biswas | G06F 11/3457 |
| 2019/0182274 A1* | 6/2019 | Doron | G06N 3/044 |
| 2019/0222593 A1* | 7/2019 | Craig | G06N 20/20 |
| 2019/0228362 A1* | 7/2019 | Anagnostou | G06Q 10/0635 |
| 2019/0258904 A1* | 8/2019 | Ma | G06F 18/24133 |
| 2020/0036743 A1 | 1/2020 | Almukaynizi et al. | |
| 2020/0272741 A1 | 8/2020 | Bhatia et al. | |
| 2021/0110045 A1 | 4/2021 | Buesser et al. | |
| 2021/0232976 A1* | 7/2021 | Hsiao | G06N 20/00 |
| 2021/0374610 A1* | 12/2021 | Dirac | G06N 20/00 |
| 2022/0078203 A1* | 3/2022 | Shakarian | G06F 16/951 |
| 2022/0147622 A1* | 5/2022 | Chesla | G06F 21/577 |
| 2023/0038196 A1* | 2/2023 | Labreche | G06F 21/577 |
| 2023/0134546 A1* | 5/2023 | Gopalakrishnan | H04W 12/08 726/23 |
| 2023/0141928 A1* | 5/2023 | Sterba | H04L 63/1416 726/22 |
| 2024/0111996 A1* | 4/2024 | Allen | G06F 7/023 |

* cited by examiner

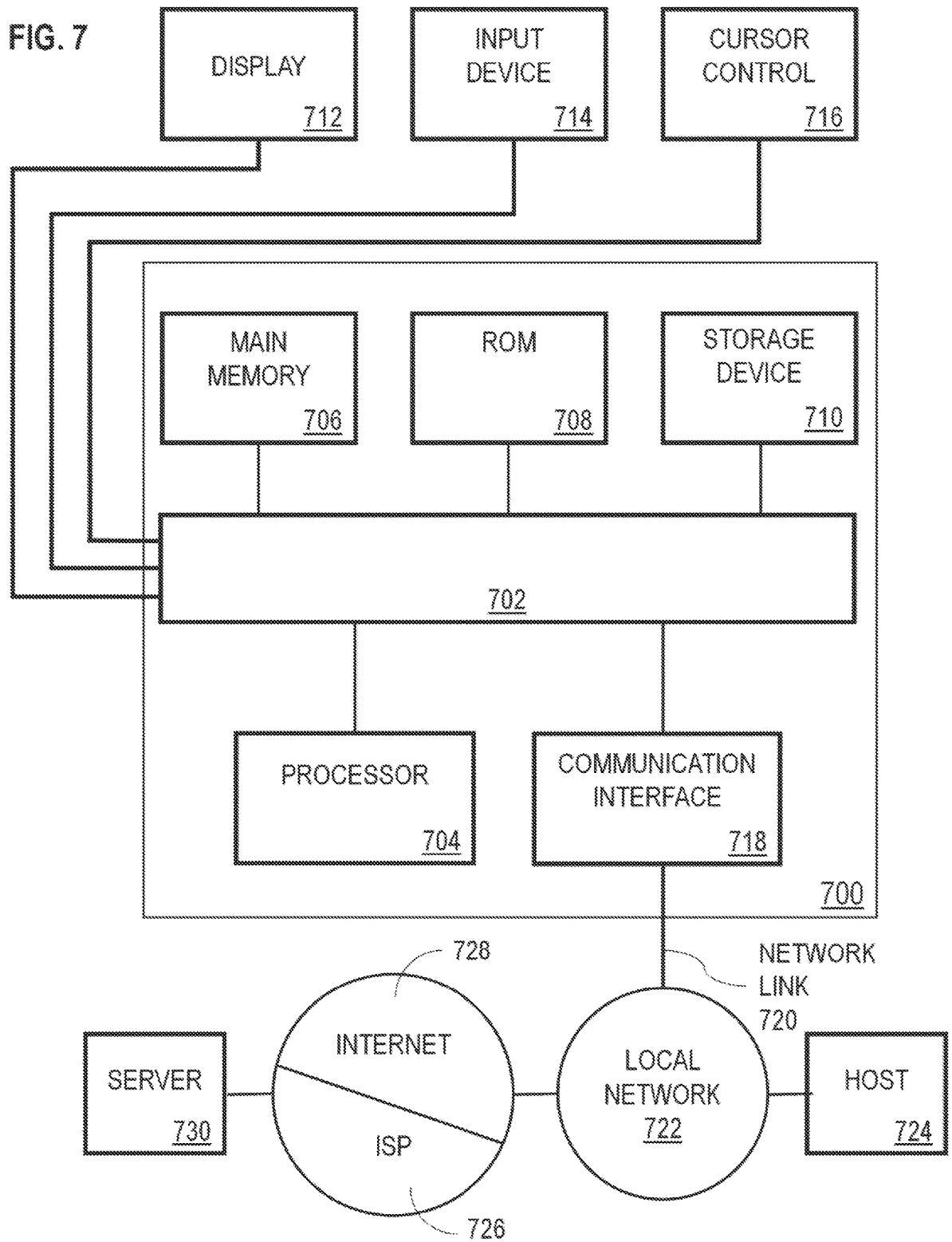

__US 12,368,739 B2__

ADAPTIVE NETWORK ATTACK PREDICTION SYSTEM

TECHNICAL FIELD

The present disclosure relates to network attack detection, prevention, and mitigation. In particular, the present disclosure relates to using machine learning to adaptively predict and prevent attacks on accounts accessible over a network.

BACKGROUND

A network attack is an attempt to gain unauthorized access to a set of computing resources that are accessible over a network. Successful network attacks may allow unauthorized parties to view and copy sensitive data, thereby compromising data security. In more severe cases, attackers may modify, encrypt, or otherwise corrupt data. Data breaches may lead to serious repercussions for individuals and organizations, including liability stemming from the loss or unauthorized use of private data.

Network administrators may deploy preventative measures to counter network attacks. For example, network administrators may set a threshold number of password attempts before locking a user account, install antivirus software to monitor the network for viruses, and encrypt sensitive data to reduce the likelihood of unauthorized access. However, network attacks are constantly evolving, and it may be difficult to anticipate every attack technique.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 illustrates a computer system in accordance with some embodiments.

DETAILED DESCRIPTION

Figure 1:
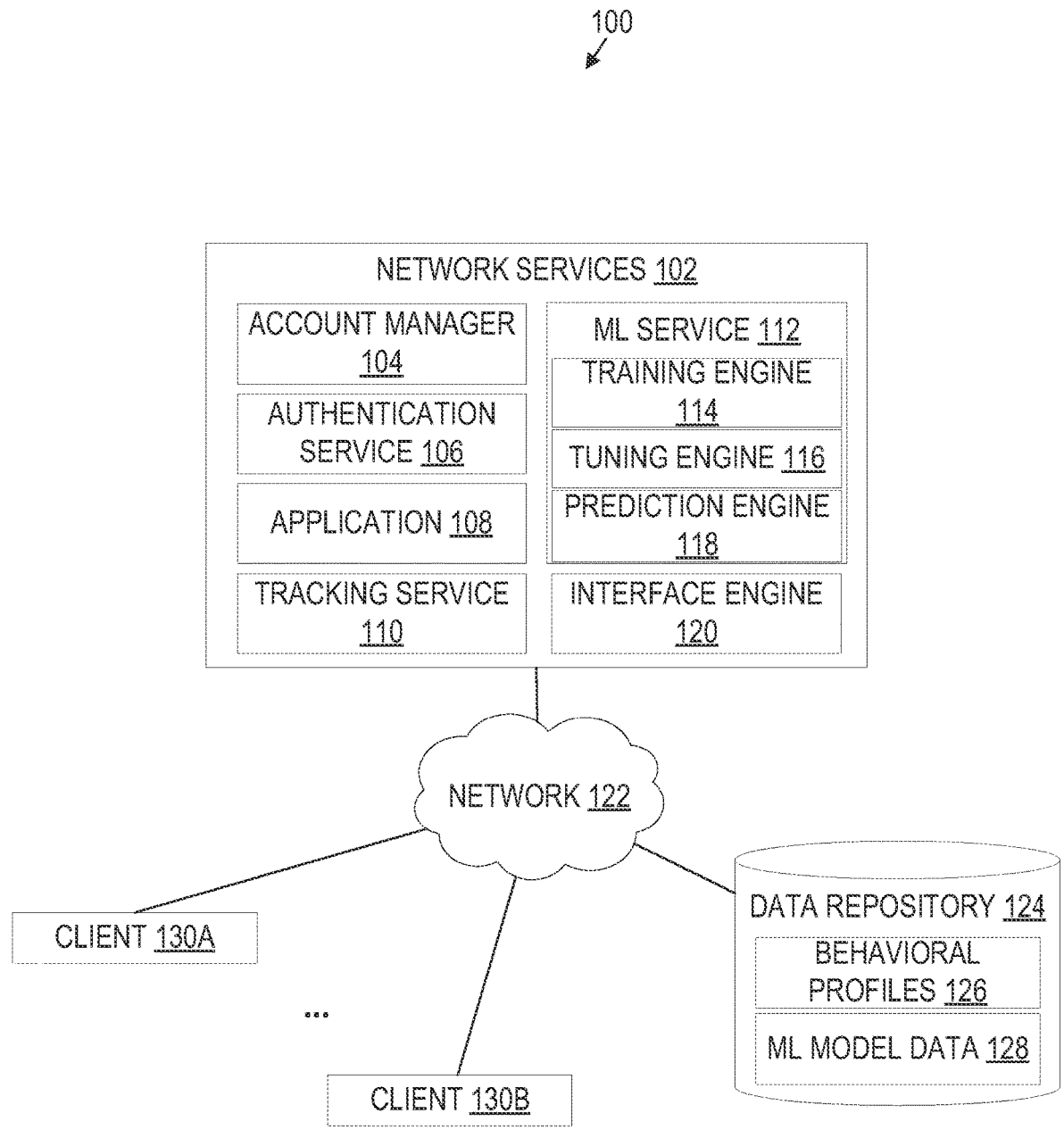
FIG. 1 illustrates an example system for adaptive network attack prediction in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE FOR ADAPTIVE NETWORK PREDICTION
3. MODELS FOR ADAPTIVE NETWORK ATTACK PREDICTIONS
   3.1 FEATURE EXTRACTION AND ENGINEERING
   3.2 MODEL TRAINING
   3.3 MODEL EVALUATION AND TUNING
4. EXAMPLE MODEL PREDICTIONS AND INSIGHTS
5. ADAPTIVE ATTACK PREVENTION AND MITIGATION
6. COMPUTER NETWORKS AND CLOUD NETWORKS
7. MICROSERVICE APPLICATIONS
8. HARDWARE OVERVIEW
9. MISCELLANEOUS; EXTENSIONS

1. General Overview

Machine-learning (ML) techniques and models are described for predicting the number and severity of network attacks within a specified timeframe, such as the next fifteen minutes. In some embodiments, the techniques include training an ML model based on features extracted from a training dataset. The trained model may be applied in real time to estimate (a) the probability of an attack happening on an account within the specified timeframe; (b) how many attacks are predicted to occur in the specified timeframe; and/or (c) the severity of the attacks predicted to occur. The system may deploy preventative measures based on the ML model output to counter or mitigate the effects of predicted and coordinated network attacks.

During a training phase, an ML engine may receive a training dataset including a plurality of examples of user behavior associated with one or more user accounts. The ML engine may use the training dataset for training the ML model to learn atypical behavior that is predictive of attacks, including the number and/or severity of the attacks. The training process may include feature extraction to transform the examples into a set of feature vectors that capture behavioral attributes associated with accounts. Example features include the number of vulnerability scanners, directory traversals, structured query language (SQL) injection attempts, login successes, login failures, detected attacks, blocked addresses, and different locations associated with login attempts within a particular timeframe, such as the past five minutes. The ML engine may then construct one or more ML models as a function of the varying feature values to learn what behavior associated with a user account is most predictive of a network attack.

In some embodiments, ML engine may construct ML models on a per account basis. By constructing separate ML models for different accounts, the system may learn different prototypical behaviors for various users. Behavior that is atypical for one user may not be atypical for another user. Additionally or alternatively, the number and/or severity of likely attacks may vary for different users even when exhibiting similar behavior. Machine learning allows for prototypical behaviors to be learned at application runtime, thereby avoiding hard-coded rules which may not be universally applicable to all user accounts. The ML model may further evolve as prototypical behavior changes over time, adapting to new attack techniques. The ML model may be periodically or continuously retrained as new behavior is observed.

During an inference phase, the ML engine may generate predictions by applying the trained ML model to newly observed behavior associated with a user account. When applying the model, the ML engine may perform feature extraction and transformation to generate a feature vector in the same manner as the training phase. For example, the ML engine may generate a feature vector as a function of how many vulnerability scanners, directory traversals, SQL injection attempts, login successes, login failures, detected attacks, blocked addresses, and different locations associated with login attempts were observed within the past five minutes or some other timeframe. The newly observed data may be unique, not exactly matching any previous examples in the training dataset due in part to the extremely large number of possible permutations of the extracted feature values. The ML model may receive the feature vector as input and output a set of one or more predictions about upcoming network attacks associated with the user account.

A system may use the ML model predictions to provide analytic insights and/or trigger responsive actions to address predicted attacks in the future. For example, the system may use the output of the ML models to filter or sort a list of accounts based on the severity and/or volume of the predicted attacks on each account. Additionally or alternatively, the system may implement preventative actions at runtime, including selectively enabling or disabling security measures on an account-by-account basis based on the predicted network attack risks.

One or more embodiments described in this Specification and/or recited in the claims may not be included in this General Overview section.

2. System Architecture for Adaptive Network Attack Prediction

In some embodiments, an adaptive network attack prediction system predictively monitors a set of user accounts that provide access to one or more network services and/or one or more networked computing resources. A user account may provide a mechanism through which a system identifies, tracks, and/or authenticates distinct users. A user may log into a user account through an authentication process, which may require the user to submit a password and/or other authentication credentials. Once logged in, the user may access files, applications, and/or other resources that the user is authorized to access.

In some embodiments, each user account is associated with a different home directory, which may serve as the root directory for a corresponding user account and store files generated based on the activity of a user logged into the user account. Access to a root directory may be restricted to the corresponding user account and one or more administrator accounts, thereby preventing unauthorized access to a user's files by other users of a network service. Further, when a user is logged in to a user account, the system may constrain user access to the root directory associated with the user account to prevent unauthorized access to private system resources.

In some embodiments, the set of user accounts may include accounts to access one or more cloud services. A cloud service may include computing infrastructure, platforms, and/or software that are hosted by third-party service provider and made available through the internet. Example cloud service models include software-as-a-service (SaaS), database-as-a-service (DBaaS), platform-as-a-service (PaaS) and infrastructure-as-a-service (IaaS). Users may create an account as part of a subscription with one or more cloud services.

In some embodiments, cloud services may allow subscribing entities to build and deploy network services that are accessible to other users. For example, a cloud service may host software and/or hardware resources provisioned to a subscriber for customizing and launching an e-commerce website. Online shoppers may visit and create separate accounts to access the website and/or subscribe to an online service. Thus, a primary subscriber account may manage or otherwise be associated with a plurality of shoppers, secondary subscribers, and/or other users accounts that have access to an online service created by the primary subscriber using the provisioned cloud resources, resulting in a multi-level hierarchy of user accounts. The network attack prediction technique may be applied to one or more levels of user accounts as described further herein.

FIG. 1 illustrates an example system for adaptive network attack prediction in accordance with some embodiments. As illustrated in FIG. 1, system 100 includes network services 102, network 122, data repository 124, and clients 130a-b. System 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, network services 102 includes a set of hardware and/or software resources that are accessible via network 122. Network services 102 may represent one or more cloud services, such as IaaS, PaaS, DBaaS, and/or SaaS applications. Additionally or alternatively, network services 102 may include a set of components for managing a set of user accounts for identifying, tracking, and/or authenticating distinct users. The set of components may include account manager 104, authentication service 106, applications 108, tracking service 110, ML service 112, and interface engine 120. As previously mentioned, the components within system 100, including network services 102 may vary. In some cases, a function performed by one component may be combined or otherwise implemented by another component within system 100. Additionally or alternatively, the components of networks services 102 may execute locally or remotely from one another.

In some embodiments, account manager 104 manages user accounts that have access to network services 102. For example, account manager 104 may manage the creation of new user accounts as users subscribe to a service and the deletion of accounts. Additionally or alternatively, account manager 104 may assign identifiers that uniquely identify distinct user accounts. Additionally or alternatively, account manager 104 may manage other aspects of a user account, such as privacy settings, identity and access management (IAM) policies, and user account access authorizations.

Once a user account is created, users may log in to the user account when successfully authenticated by authentication service 106. In some embodiments, authentication service 106 implements one or more authentication protocols to verify user identities. Example authentication protocols include the password authentication protocol (PAP), challenge-handshake authentication protocol (CHAP), and authentication, authorization, and accounting (AAA) protocols. During a login attempt, users may submit a username, password, digital certificate, and/or other credentials. Authentication service 106 may check the credentials and block the login attempt if the credentials are not successfully verified.

If the credentials are successfully authenticated, the user may be granted permission to access a restricted set of network resources, such as application 108, which may comprise software and/or services to perform tasks directed by the end user. For example, an SaaS application may include software and services to manage customer relations, operations, social media, inventory, website design, and/or e-commerce functions. However, the application-specific functions may vary depending on the network service and/or the user subscription.

Tracking service 110 may generate logs that track the activity of users logged into and/or attempting to log into user accounts. In some embodiments, tracking service 110 includes one or more monitoring agents, such as daemons and/or log-generating processes, that trace or otherwise capture user requests. For example, tracking service 110 may track the number of directory traversals, the number of standard query language (SQL) injection attempts, the number of successful login attempts, the number of failed login attempts, the location of login attempts, and/or the number of vulnerability scans triggered with respect to one or more user accounts. Additionally or alternatively, other metrics may be logged by tracking service 110 to track the behavior of online users.

In some embodiments, ML service 112 includes components for profiling user behavior and learning what behavioral patterns are predictive of future network attacks. ML service 112 may make inferences and adjustments during application runtime rather than relying on static instruction sets to perform tasks. Thus, system 100 may adapt in real-time to varying and evolving behaviors indicative of attacks without requiring addition hard-coding of new attack patterns.

In some embodiments, ML service 112 includes training engine 114 for training ML models, tuning engine 116 for adjusting ML model parameters and/or hyperparameters, and prediction engine 118 for applying trained ML models. Techniques for training and tuning ML models are described further in Section 3, titled Models for Adaptive Network Attack Predictions.

Interface engine 120 may provide a user interface for interacting with network services 102. Example user interface may comprise, without limitation, a graphical user interface (GUI), an application programming interface (API), a command-line interface (CLI) or some other interface for accessing network resources. Interface engine 120 may serve interface components to client applications, including clients 130a-b, which may render the elements in a display. For example, a client may be a browser, mobile app, or application frontend that displays user interface elements for invoking one or more of network services 102 through a GUI window. Examples of user interface elements include checkboxes, radio buttons, dropdown lists, list boxes, buttons, toggles, text fields, date and time selectors, command lines, sliders, pages, and forms.

Users may use clients 130a-b, which may include client applications and/or devices, to connect with network services 102 via network 122. Network 122 represents one or more interconnected data communication networks, such as the internet. Clients may connect with network services 102 according to one or more communication protocols. Example communication protocols may include the hypertext transfer protocol (HTTP), simple network management protocol (SNMP), and other communication protocols of the internet protocol (IP) suite.

In some embodiments, the network resources include data repository 124. Data repository 124 may include volatile and/or non-volatile storage for storing behavioral profiles 126 and ML model data 128. Behavioral profiles 126 may include metrics and learned patterns representing typical user behavior for one or more user accounts. ML model data 128 may store model artifacts and outputs. For example, ML model data 128 may store weights, biases, hyperparameter values, and/or other artifacts obtained through model training. Additionally or alternatively, ML model data 128 may include predictions and/or other values from obtained from evaluating and applying a trained ML model.

In some embodiments, the ML model predictions and related functions are exposed through a cloud service or a microservice. A cloud service may support multiple tenants, also referred to as subscribing entities. A tenant may correspond to a corporation, organization, enterprise or other entity that accesses a shared computing resource. Different tenants may be managed independently even though sharing computing resources. For example, different tenants may have different account identifiers, access credentials, identity and access management (IAM) policies, and configuration settings. Additional embodiments and/or examples relating to computer networks and microservice applications are described below in Section 6, titled Computer Networks and Cloud Networks, and Section 7, titled Microservice Applications.

3. Models for Adaptive Network Attack Predictions

3.1 Feature Extraction and Engineering

In some embodiments, ML service 112 generates a set of feature vectors for training an ML model. A feature vector may include a set of values for various features that capture behavioral attributes associated with a user account. For example, a feature vector $\hat{x}$ may be represented as $[x_1, x_2, \ldots, x_n]$, where $x_1$ is the value for a first feature, $x_2$ is the value for a second feature, and $x_n$ is the value for the $n^{th}$ feature.

The features that are selected for training and the number of features in the vector may vary depending on the particular implementation. One or more features may be curated by a domain expert. Additionally or alternatively, ML service 112 may select one or more features during the training and/or tuning phase based on which features yield an ML model with the highest performance. ML service 112 may extract, generate, and/or select features based on the activity tracked by tracking service 110.

In some embodiments, the set of feature values include variables representing atypical behavior detected by system 100. ML service 112 may compute a score or other metric representing a measure of a degree or severity of the detected atypical behavior. For instance, if a login attempt is detected, then the location of the attempted login, IP address, browser, language settings, and/or other activity may be atypical for a particular user account. Example features to track the user behavior may include outlier scores for the city, country, IP address, region, user's browser, user's language, and/or network provider associated with a login or attempted login.

Figure 2:
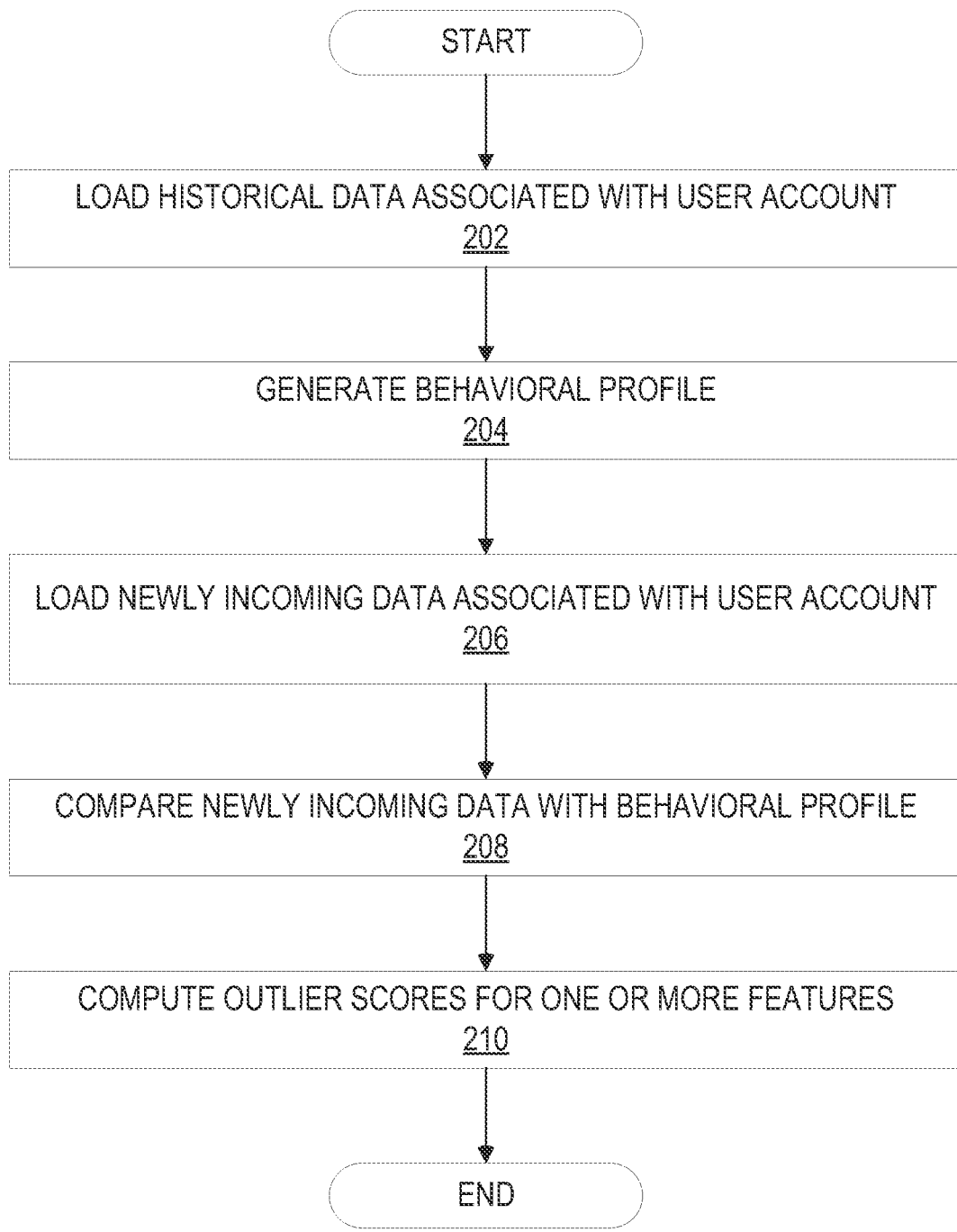
FIG. 2 illustrates an example set of operations for generating outlier scores in accordance with some embodiments.

ML service 112 may compute outlier scores for one or more features based on a behavioral profile associated with a user and/or user account. FIG. 2 illustrates an example set of operations for generating outlier scores in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, the process includes loading historical data associated with a user account (operation 202). The process may restrict the historical data to a limited timeframe, such as three weeks or may give greater weight to more recent activity to accommodate evolving user behavior. The historical data may include various behavioral attributes including data tracking the location, IP address, browser, settings, login attempt successes, and/or login attempt failures.

Once loaded, the process generates a behavioral profile for the user (operation 204). The behavioral profile may identify typical values and frequencies for varying behavioral attributes. For example, the behavioral profile may identify a list of cities, countries, languages, and/or other attribute values observed within the historical data. The behavioral profile may indicate which of the observed values, if any, were associated with a network attack In some embodiments, the process loads newly incoming data associated with the user account (operation 206). In streaming applications, the incoming data may be loaded concurrently as the system generates and updates the behavioral profile for the user. System 100 may continuously monitor and load user activity data to provide real-time attack prediction and mitigation.

In some embodiments, the process compares the newly incoming data with the behavioral profile associated with the user account (operation 208). For example, the process may compare the city, country, IP address, browser, language, and/or other attributes for a new login attempt with observed typical and/or atypical behavior. Additionally or alternatively, the process may compare other attributes to the behavioral profile, which may vary depending on the particular implementation.

Based on the comparison, the process computes an outlier score for one or more features associated with the user account (operation 210). An outlier score for a feature may be computed based at least in part on whether the detected feature value represents typical or atypical behavior for a user. A greater score may indicate that the value is more atypical than a lower score. The scores may be normalized, such as on a scale between 0 and 1, where 1 represents highly atypical behavior and 0 represents typical behavior. For example, if a city, language, or other value is highly atypical for a user account and associated with observed attacks, then the process may assign the feature an outlier score of 1. If the feature values are occasionally observed but not frequently associated with attacks, then a value of less than 1 may be assigned. Frequently observed values that are not associated with attacks may be assigned a score of 0. However, the scoring system may vary from implementation to implementation.

In some embodiments, the features used to train the ML model may include one or more aggregated features. An aggregated feature may refer to an aggregated set of observations associated with an account. Example aggregated features may include the number of vulnerability scanners, directory traversals, SQL injection attempts, login successes, login failures, blocked addresses, cities in login failures, countries and/or login failures within observed within a threshold timeframe, such as the last 5 minutes.

Tracking service 110 may maintain a count for one or more aggregated features that tracks how many instances of a feature were detected within a particular window of time. The length of the window for aggregating feature count values may be configurable and/or set by a domain expert or other user. Additionally or alternatively, system 100 may select the length of the window, such as during model training and/or model tuning to optimize model performance.

3.2 Model Training

Training engine 114 may use a set of feature vectors associated with a user account to train one or more ML models. In some embodiments, training engine 114 builds one or more decisions trees, which may include random forests and/or gradient boosted trees. However, training engine 114 may train other ML models including support vector machines (SVMs) and artificial neural networks.

Figure 3:
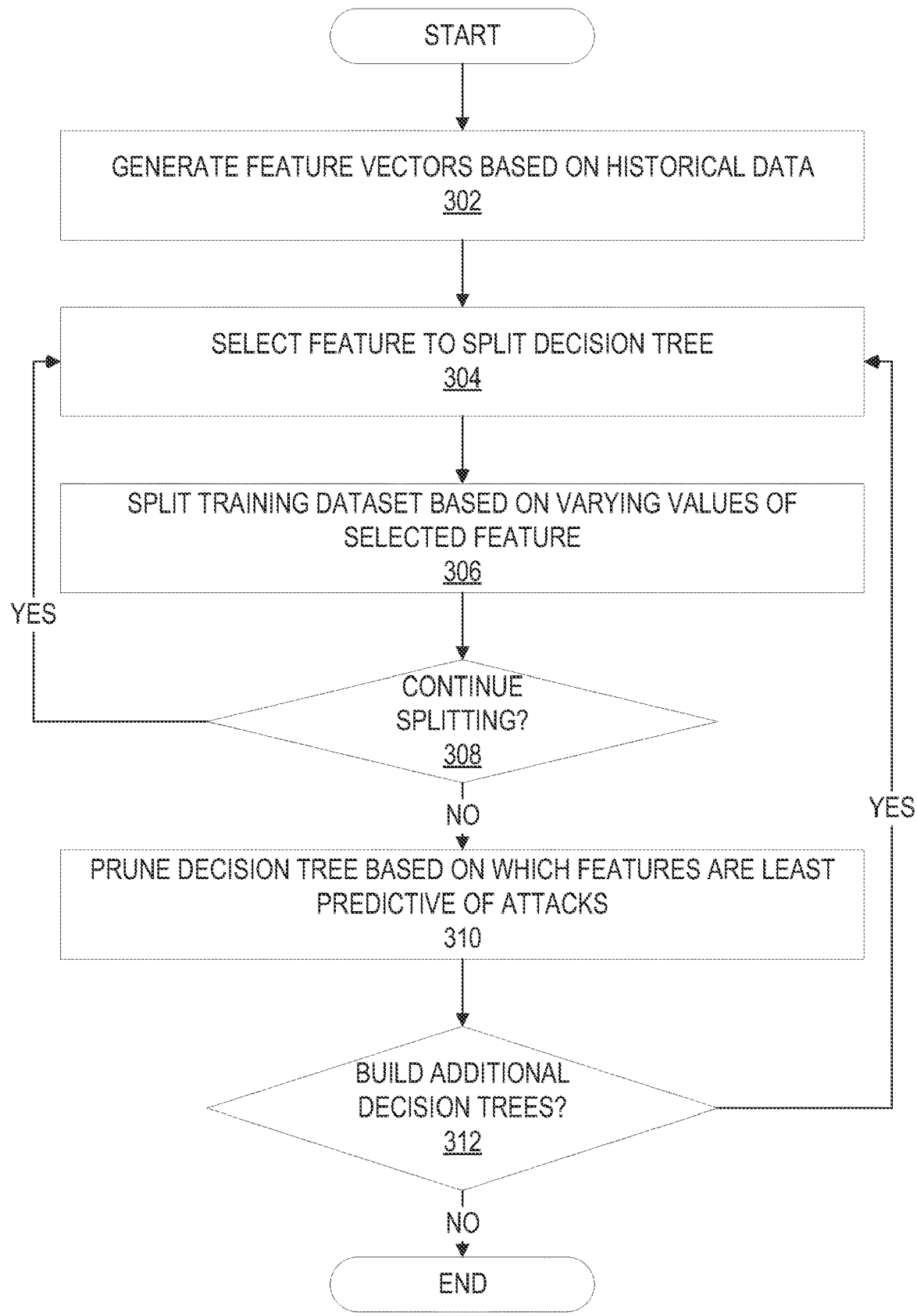
FIG. 3 illustrates an example set of operations for training a machine-learning model to adaptively predict network attacks in accordance with some embodiments.

FIG. 3 illustrates an example set of operations for training a machine-learning model to adaptively predict network attacks in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

Referring to FIG. 3, the process includes generating a set of feature vectors based on historical data (operation 302). For example, a feature vector may include outlier scores and/or aggregated feature values. Training engine 114 may create multiple feature vectors representing different examples of observed user behavior. The feature vectors may be associated with labels that identify attacks, if any, that occurred within a threshold timeframe, such as within fifteen minutes of the observed values. The label may identify how many attacks occurred and/or a severity of the attacks. Additionally or alternatively, the label may identify a type of attack, such as whether the attack was a SQL injection attempt, directory traversal attack, credential stuffing attack, or other attack scenario.

In some embodiments, the process selects a feature to split a decision tree (operation 304). The process may select the feature to minimize the cost of an error function, such as the Gini Index function defined as $E => \Sigma(p_a*(1-p_a))$, where $p_a$ represents the proportion of training examples in a particular class of a prediction node. For instance, $p_a$ may represent the proportion of data where a threshold number of attacks were detected or where a particular category of attack was detected (e.g., severe attack, moderate attack, no attack). As another example, the process may determine that an outlier score of 0.4 for a particular feature minimizes the error function. However, the selected feature and feature value used to split the tree may vary depending on the particular activity detected within the account. The process may implement a greedy algorithm to identify the feature and feature value used to split the tree, although the manner in which the selection is made may vary depending on the particular implementation.

The process next splits the training dataset based on the selected feature (operation 306). For example, if an outlier score of 0.4 for a city is selected, then training examples with a value less than 0.4 may be assigned to one branch of the tree and greater than 0.4 to another branch of the tree. If another value and/or feature is selected, then the process splits along the learned boundary.

In some embodiments, the process determines whether to continue splitting the decision tree (operation 308). The process may continue to split the tree until a set of one or more stopping criteria are satisfied. For example, the process may split the tree until the number of examples assigned to one or more leaf nodes falls below a minimum threshold. If the stop criteria are not satisfied, then the process may return to operation 304, recursively splitting the tree.

Once the stop criteria are satisfied, then the process may prune the decision tree based on which features are least predictive of attacks (operation 310). For example, if a node splits two groups of training examples that have little or no difference in observed attacks, then the node may be pruned. Additionally or alternatively, the process may determine the difference in the error function when the node is pruned. If it is greater than a threshold, then the prune may be reversed, and the node may be reinserted into the tree. If the difference in the error function is less than a threshold, then the prune may be maintained. As a result, the examples or branches that are split may be merged. The process may continue pruning nodes until removing one of the remaining nodes changes the result of the error function more than a threshold amount or a minimum threshold number of nodes remain.

Once the decision tree is built, the process may determine whether to build additional decision trees (operation 312). Multiple decision trees may be constructed in the case of random forest and gradient-boosted decision trees. For example, to generate a random forest, the training data may be split into several groups of examples. Each distinct set of training examples may be used to independently construct a separate decision tree. With gradient-boosted decision trees, several trees are constructed sequentially, with each new decision tree minimizing an error function, such as the mean squared error or logarithmic loss, of one or more previous trees in the sequence. Random forests and gradient-boosted decision trees may reduce overfitting and improve prediction accuracy of the trained ML model.

3.3 Model Evaluation and Tuning

In some embodiments, tuning engine 116 evaluates the trained ML model and tunes the ML model to optimize performance. Tuning engine 116 may measure performance using an F-measure, such as an F1 score. The F-measure evaluates the model based on precision and recall, with the F1 score representing a harmonic mean between the two factors. Tuning engine 116 may adjust the trained ML model parameters and hyperparameters until the F-score satisfies a threshold. Although the F-score is used in the examples herein, in other embodiments, tuning engine 116 may use other measures of accuracy to tune the ML model, such as the mean average precision (MAP) and R-Precision metrics.

Figure 4:
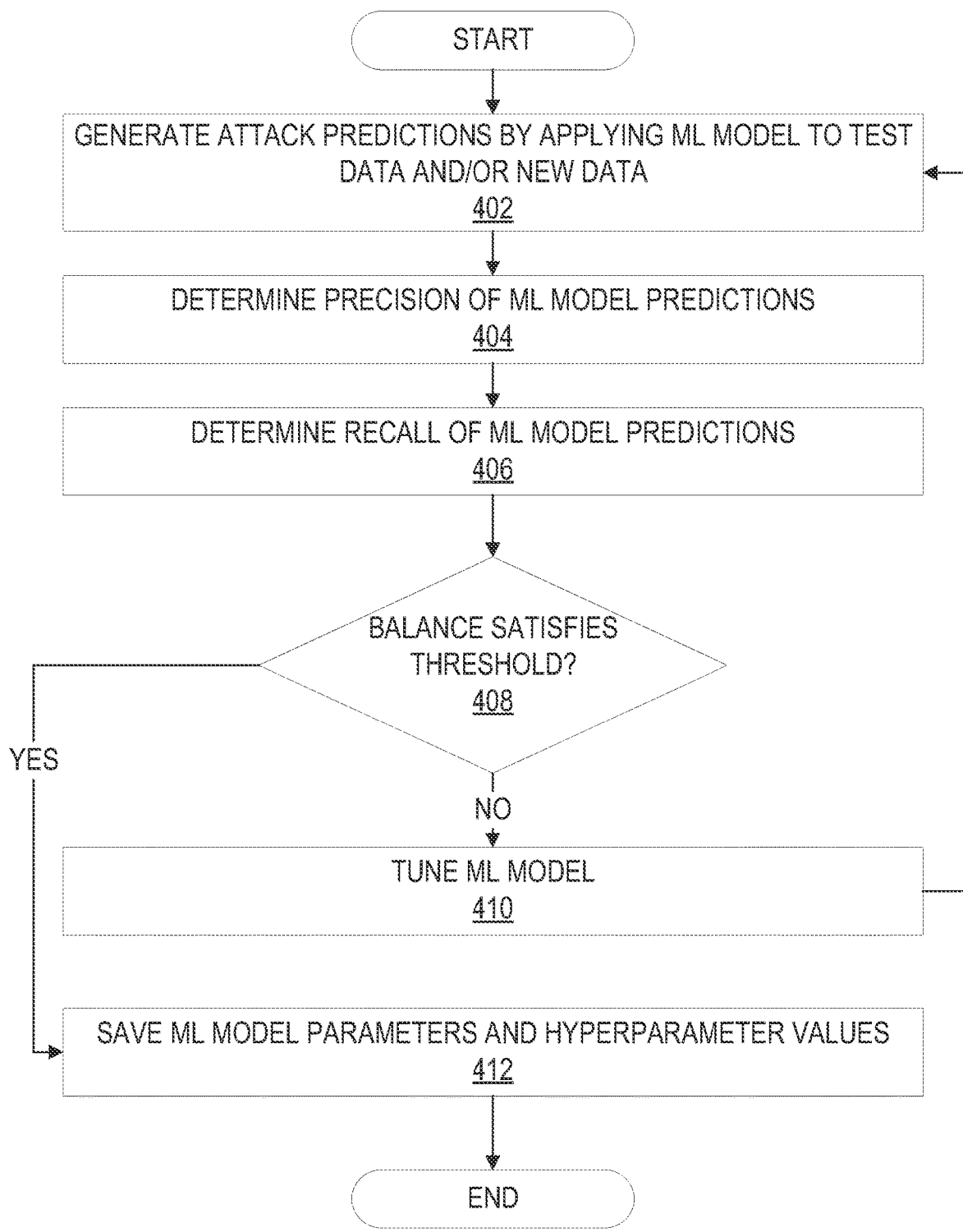
FIG. 4 illustrates an example set of operations for tuning a machine-learning model to adaptively predict network attacks in accordance with some embodiments.

FIG. 4 illustrates an example set of operations for tuning a machine-learning model to adaptively predict network attacks in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, the process includes applying the trained ML model to test data and/or newly incoming data to generate attack predictions (operation 402). The process may then compare the predictions to the observed attacks to evaluate the model.

In some embodiments, the process determines the precision of the ML model predictions (operation 404). The process may compute the precision by dividing the number of accurately predicted attacks by the total number of predicted attacks, including those that were predicted but not observed. Thus, the precision may be used as a measure to indicate how effective the ML model is at avoiding false flag alerts.

In some embodiments, the process determines the recall of the ML model predictions (operation 406). The process may compute the recall by dividing the number of accurately predicted attacks by the total number of observed attacks. Thus, the recall may be used as a measure to indicate how sensitive the ML model is to detecting attacks.

In some embodiments, the process determines whether the balance between precision and recall satisfies a threshold (operation 408). For example, the process may determine whether the harmonic mean is above a threshold value. An F1 score above 85% may indicate a good balance in some applications. However, the threshold may vary depending on the particular implementation.

If the balance does not satisfy the threshold, then the process may tune the ML model by adjusting one or more model hyperparameters and/or parameters (operation 410). Example hyperparameters and parameters may include the depth of the decision tree, the number of decision trees in a random forest, the length of a window for aggregating feature counts, the minimum number of training examples per leaf, and the set of features selected to use the build the decision tree. Additionally or alternatively, tuning engine 116 may adjust other parameter values associated with the model. The process may continue adjusting values until the balance between precision and recall is satisfied.

Once a threshold balance has been achieved, the process may store the ML model parameter and hyperparameter values (operation 312). Prediction engine 118 may access the stored values to apply the ML model to newly incoming data as user activity is monitored in real-time.

4. Example Model Predictions and Insights

Figure 5:
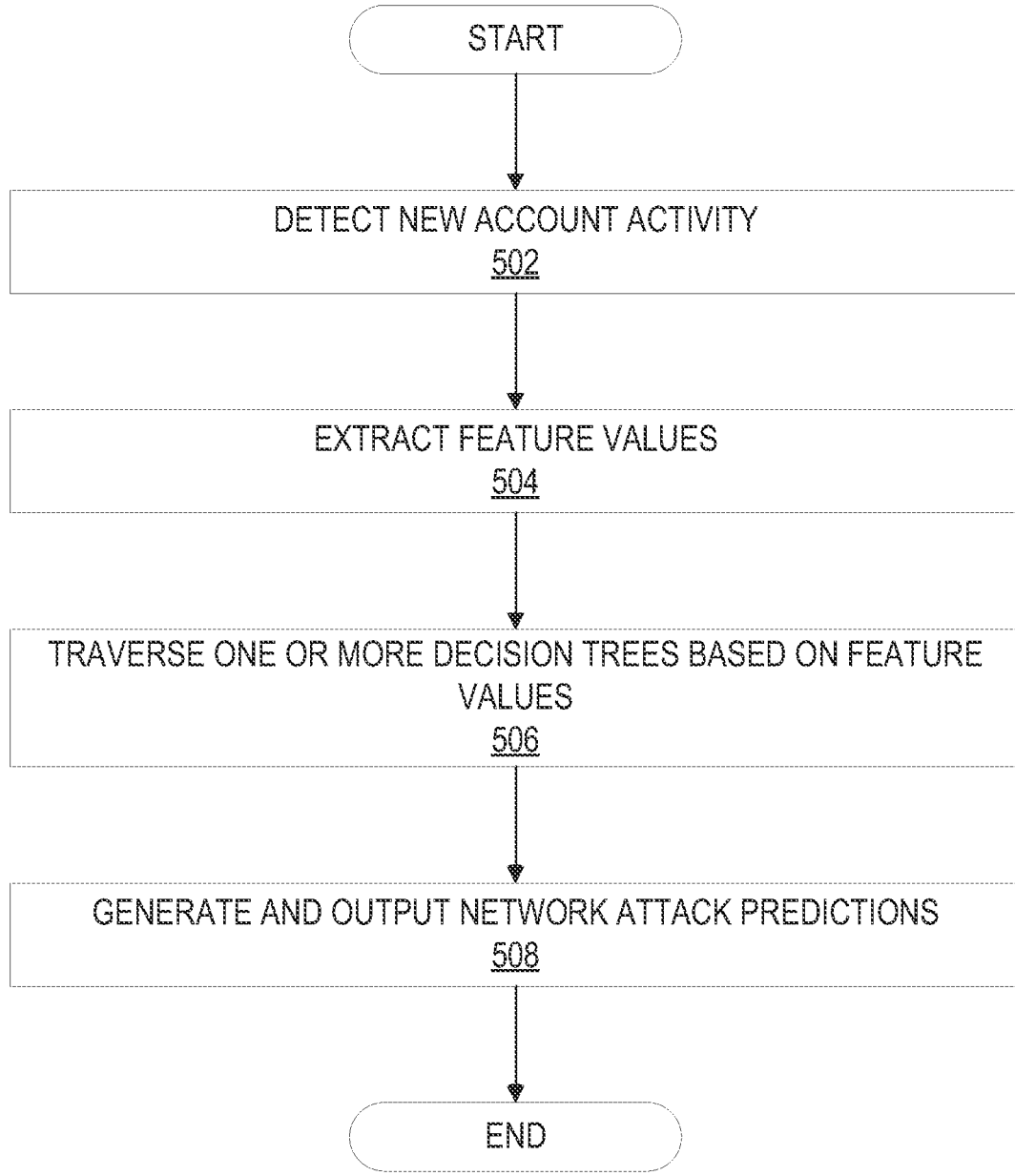
FIG. 5 illustrates an example set of operations for applying a machine-learning model to adaptively predict network attacks in accordance with some embodiments.

FIG. 5 illustrates an example set of operations for applying a machine-learning model to adaptively predict network attacks in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

Referring to FIG. 5, the process detects new account activity (operation 502). For example, the process may detect new login attempts, client requests, database queries, directory traversals, and/or other activity associate with a user account.

Responsive to detecting the new account activity, the process extracts a set of feature values (operation 504). In some embodiments, the process generates a feature vector from the same set of features used to build the trained decision tree. For example, the process may compute outlier scores and aggregate features as described in the previous section.

The process further traverses one or more decision trees based on the extracted feature values (operation 506). For example, the process may compare an outlier score associated with a particular feature with a particular node value. If the outlier score is above the value defined for the tree node, then the process may proceed down one branch of the decision tree. If the outlier score is below the value, then the process may proceed down the other branch of the decision tree. The process may continue comparing feature values to tree node values until a leaf node is reached. If there are multiple decision trees, such as with a random forest, then the process may traverse each of the decision trees in the ML model.

Based on the tree traversal, the process generates and outputs a set of one or more network attack predictions (operation 508). For example, the ML model may predict a probability of an attack occurring within a specified timeframe, such as the next 15 minutes or up to some other horizon. Additionally or alternatively, the output of the ML model may identify the number of attacks predicted to happen, a severity level, and/or whether the attack behavior is predicted to be abnormal within a threshold timeframe, which may be specified in terms of a specified horizon (e.g., the next n minutes).

In embodiments where multiple decision trees are used, such as with random forests, the process may compute a final prediction by aggregating predictions of multiple trees. For example, the process may compute the mean, median, or mode prediction of the decision trees. The process may then output the aggregate result.

Table 1 illustrates an example set of sample outputs from a trained ML model in accordance with some embodiments:

TABLE 1

SAMPLE MODEL OUTPUTS

| Probability of attack happening in next 15 minutes | Number of attacks predicted to happen in next 15 minutes | Behavior predicted to happen in next 15 minutes |
|---|---|---|
| 20% | 18 | normal |
| 10% | 7 | normal |
| 70% | 42 | attack |
| 50% | 33 | attack |
| 100% | 340 | attack |
| 100% | 483 | attack |

As illustrated in Table 1, the first column includes a set of predictions of the probability of an attack in the next 15 minutes, the second column identifies the number of attacks predicted to occur in the next 15 minutes, and the third column classifies the behavior predict to occur in the next 15 minutes. The model output provides insights into how at risk a system is of a network attack. The model output may be consumed by users, applications, and/or systems to perform appropriate prevention and mitigation actions, if warranted.

Figure 6A:
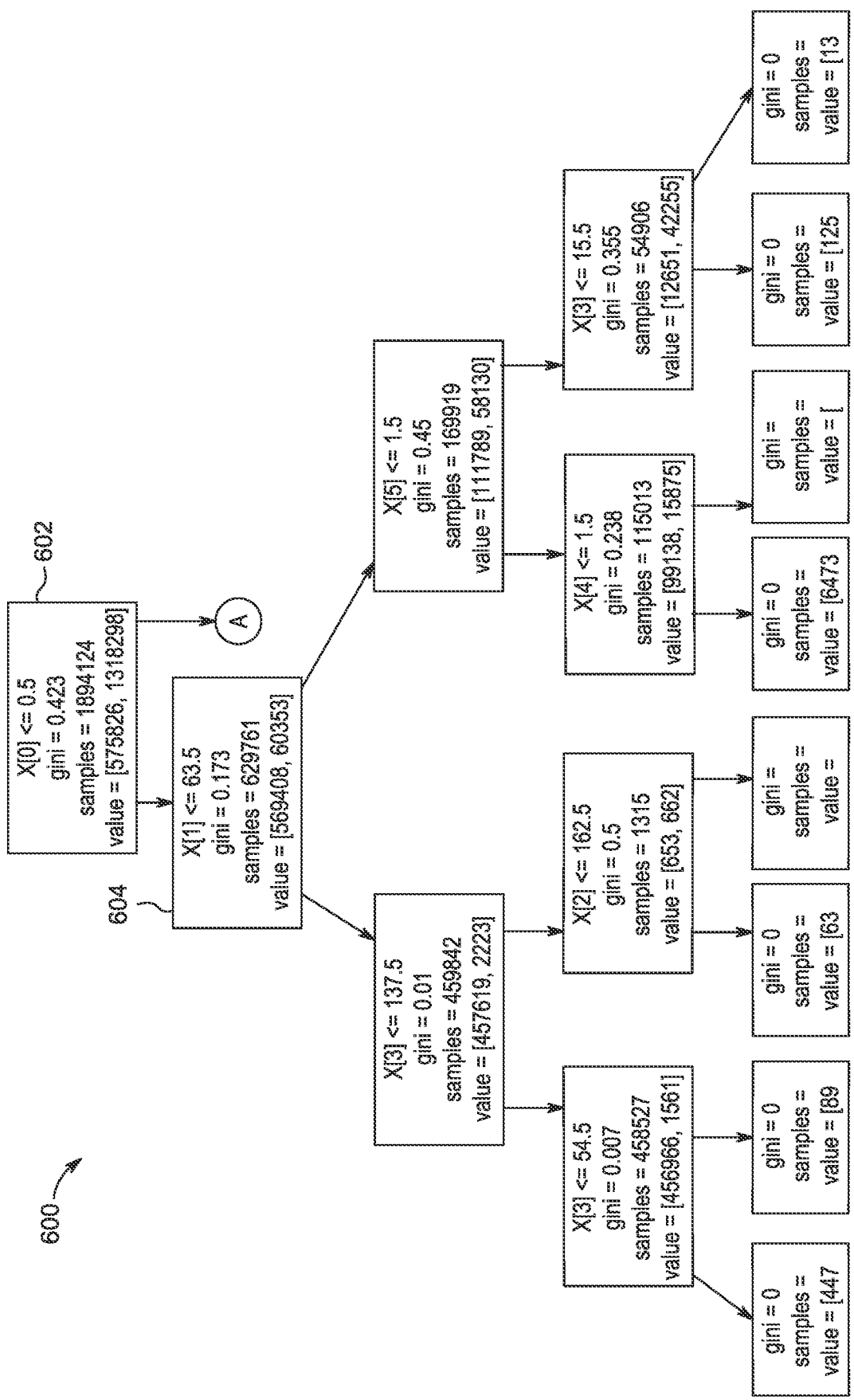
FIG. 6 illustrates an example decision tree model for adaptively predicting network attacks in accordance with some embodiments.
Figure 6B:
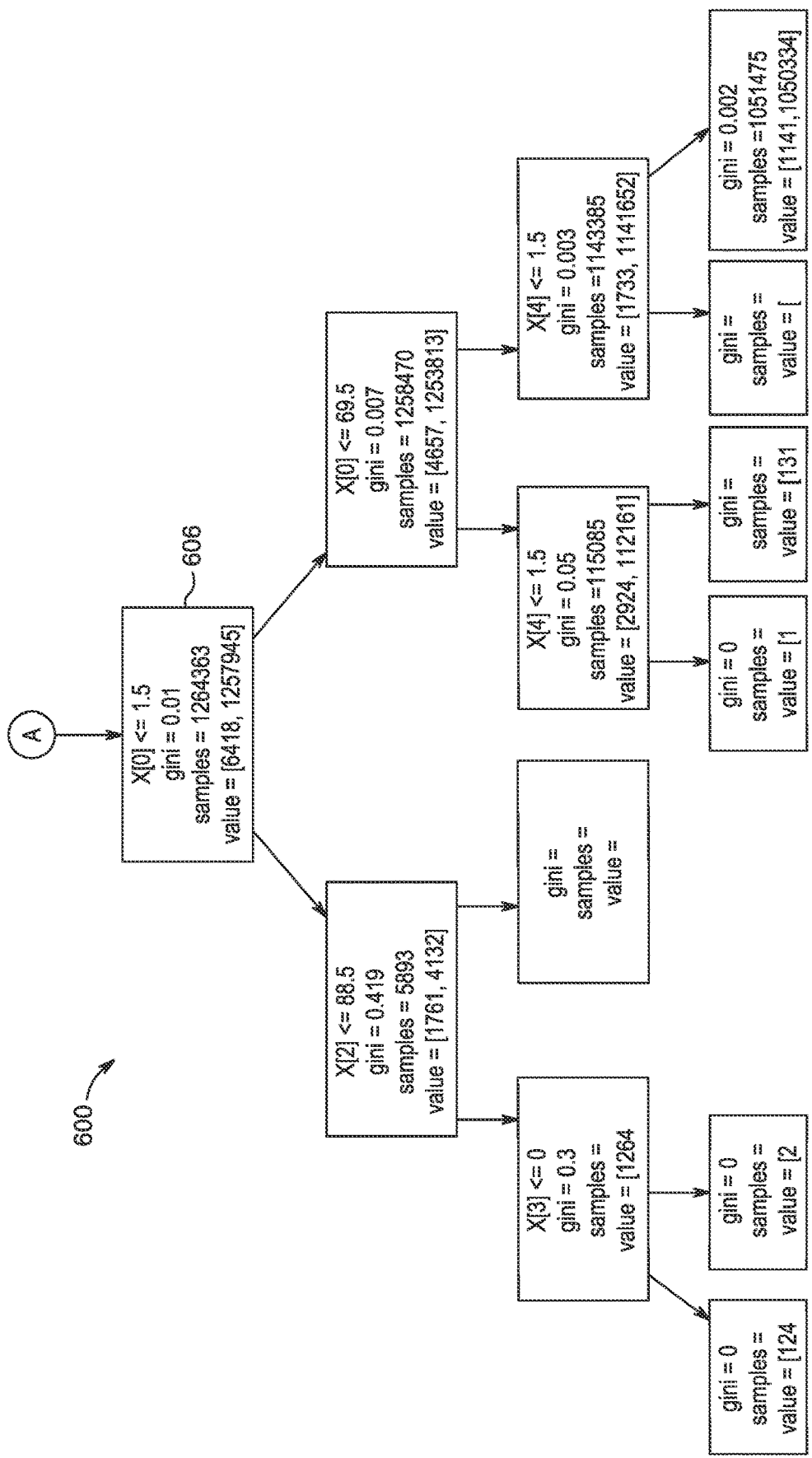

FIG. 6 illustrates an example decision tree model for adaptively predicting network attacks in accordance with some embodiments. Decision tree 600 includes several nodes including node 602, node 604, and node 606. Node 602 is the root of the decision tree and splits the training samples based on feature x [0]. Samples that have a corresponding value greater than 0.5 are assigned to the right side of the tree, and samples with a value less than or equal to 0.5 are assigned to the left side of the tree. The Gini Index Function for the node is 0.423, and the total number of samples under the node is 1,894,124.

Node 604 splits training samples on the left side of the tree based on feature x [1]. Samples with feature values greater than 63.5 are assigned to the right leaf node from node 602, and sample with feature values less than or equal to 63.5 are assigned to the left leaf node. Node 606 uses the same feature, x[0], as node 602, but splits samples using a higher value.

As previously indicated, the process may traverse nodes of the decision tree to make predictions about upcoming network attacks. As an example, traversing the decision tree may yield the following model interpretation:

If (NumberOfVulnScanner<=1.5) and (NumberOfDirTrav<=0.5) and
(numberOfSqlInjectionAttempt<=215.5)
Then NrOfAttackInNext15 minutes=20

In the above example, the process may follow a path through the decision tree based on the number of detected vulnerability scanners, number of directory traversals, and number of SQL injection attempts in the past 5 minutes to predict the number of attacks in the next 15 minutes. The features, feature values, and attack predictions may vary depending on the model training and behavioral profiles associated with the user accounts.

In some embodiments, prediction engine 118 may predict network attacks at varying levels within a hierarchy of users. For example, prediction engine 118 may apply an ML model to predict attacks on subscriber accounts within a threshold timeframe, such as the next 15 minutes. Additionally or alternatively, prediction engine 118 may apply an ML model to predict an attack and the severity by each shopper's log events. Additionally or alternatively, prediction engine 118 may predict the type of attacks that will occur, such as credential stuffing attacks, SQL injection attacks, and/or directory traversal attacks. The ML models may provide insights into attacks based on the subscriber's activity and the activity of shoppers that access a service provided by the subscriber.

In some embodiments, system 100 may generate and render charts, lists, and/or other objects to present to the user based on the ML model output. For example, interface engine 120 may present a list of the top n subscriber attacks that have the highest probability of an attack or the highest number of predicted attacks within the next 15 minutes. Additionally or alternatively, interface engine 120 may highlight the top n shoppers associated with a subscriber account that have the highest predicted severity of an attack.

In some embodiments, an administrator may search and filter a list of accounts based on the model predictions. For instance, the user may request to view only a list of accounts that have more than a threshold number of attacks predicted within the next 10 minutes, that have a predicted likelihood of attack above a threshold, that have a predicted type of attack, and/or that have behavior predicted to be atypical. In response to the filter request, interface engine 120 may identify the list of accounts that satisfy the filter criteria and present information about the accounts to the end user, such as the account name, current status, and/or other account attributes.

5. Adaptive Attack Prevention and Mitigation

In some embodiments, system 100 may perform one or more attack prevention or mitigation actions based on the output of one or more trained ML models. As previously indicated, system 100 may implement preventative actions at runtime, including selectively enabling or disabling security measures on an account-by-account basis based on the predicted network attack risks. For example, system 100 may lock an account, selectively enable two-part authentication, block an IP address, send a one-time password to a user, run a vulnerability scan, and/or perform other actions to thwart a predicted attack or minimize the damage of an attack in progress.

In some embodiments, system 100 compares the ML model output for newly detected account activity to one or more thresholds. If the one or more thresholds are satisfied, then system 100 may trigger one or more of the adaptive attack prevention and mitigation actions. For example, system 100 may compare the predicted probability, number, and/or severity of attacks in the next 15 minutes on an account with corresponding thresholds. If the thresholds are satisfied, then system 100 may enable one or more of the extra security measures previously mentioned. Additionally or alternatively, the type of security measures activated may vary depending on the severity, number, and/or type of network attacks that are predicted to occur within the next 15 minutes. For instance, different security measures may be deployed for SQL injection attempts than for directory traversal attacks.

In some embodiments, administrators may configure the thresholds and/or actions taken by system 100 address a predicted attack. For example, the administrator may define a rule as follows:

If (NrOfAttackInNext15 minutes=20) and (ProbabilityOfAttackInNext15 minutes>=75%)
    Then SendOneTimePassword(useraccount)

System 100 may evaluate the rule based on the output of the ML models associated with the user account. If the number of predicted attacks and probability satisfy the thresholds, then system 100 may send a one-time password to the user via email or a short-message service (SMS) message to verify the user is active. Activity on the user account may be locked until the one-time password is received. In other embodiments, the conditions and actions defined by a rule may vary depending on the input of the administrator. Additionally or alternatively, system 100 may perform default actions or actions learned to stop attack patterns based on the ML model output.

6. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In some embodiments, the trigger, when satisfied, might output data for consumption by the target microservice. In other embodiments, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 illustrates a computer system in accordance with some embodiments. Computer system 700 includes bus 702 or other communication mechanism for communicating information, and a hardware processor 704 coupled with bus 702 for processing information. Hardware processor 704 may be, for example, a general-purpose microprocessor.

Computer system 700 also includes main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes read only memory (ROM) 708 or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT) or light emitting diode (LED) monitor, for displaying information to a computer user. Input device 714, which may include alphanumeric and other keys, is coupled to bus 702 for communicating information and command selections to processor 704. Another type of user input device is cursor control 716, such as a mouse, a trackball, touchscreen, or cursor direction keys for communicating direction information and command selections to processor 704 and for controlling cursor movement on display 712. Input device 714 typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to computer system 700 can receive the data on the network line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

9. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which, when executed by one or more hardware processors, cause:
   identifying varying values for a set of features within historical activity associated with a user account for accessing one or more network services;
   training, based on the varying values for the set of features, a machine-learning model to predict upcoming network attacks;
   detecting activity associated with the user account;
   generating, by the machine-learning model based on the detected activity, an output that identifies how many network attacks are predicted to occur up to a future horizon; and
   executing, as a function of the output of the machine learning model, a rule that compares how many network attacks are predicted to occur up to the future horizon to a configurable threshold number, wherein executing the rule performs at least one operation to secure the user account responsive, at least in part, to determining that a number of network attacks predicted to occur up to the future horizon exceeds the configurable threshold number.

2. The one or more non-transitory computer-readable media of claim 1, wherein the set of varying values include outlier scores for one or more features; wherein the outlier score is determined based at least in part on a comparison of an observed value with a behavioral profile associated with the user account.

3. The one or more non-transitory computer-readable media of claim 2, wherein outlier scores are determined for at least one of a location, network address, browser, language, or network provider associated with detected user activity.

4. The one or more non-transitory computer-readable media of claim 1, wherein the set of varying values include aggregated values for one or more aggregated features; wherein the aggregated values track one or more actions within a threshold timeframe.

5. The one or more non-transitory computer-readable media of claim 4, wherein the one or more aggregated features include at least one of a number of vulnerability scanners, directory traversals, standard query language (SQL) injection attempts, login successes, login failures, blocked addresses, cities in login failures, or countries in login failures within the threshold timeframe.

6. The one or more non-transitory computer-readable media of claim 1, wherein the machine-learning model includes one or more decision trees; wherein training the machine-learning model comprises splitting training examples from the historical activity based at least in part on how predictive the varying feature values are of network attacks.

7. The one or more non-transitory computer-readable media of claim 6, wherein the instructions further cause: pruning the one or more decision trees based at least in part on how predictive the varying feature values are of network attacks.

8. The one or more non-transitory computer-readable media of claim 1, wherein the instructions further cause: adjusting at least one model hyperparameter to balance between a precision and a recall of the machine-learning model.

9. The one or more non-transitory computer-readable media of claim 1, wherein the instructions further cause: selecting a set of features to train the machine-learning model based on measure of the machine-learning model precision and balance for varying sets of features.

10. The one or more non-transitory computer-readable media of claim 1, wherein detecting the activity associated with the user account comprises detecting one or more login attempts.

11. The one or more non-transitory computer-readable media of claim 1, wherein generating the prediction comprises traversing one or more decision trees based on values for the set of features extracted from the detected activity.

12. The one or more non-transitory computer-readable media of claim 1, wherein the output further includes a predicted probability associated with how many network attacks are predicted up to the future horizon.

13. The one or more non-transitory computer-readable media of claim 1, wherein the at least one operation includes at least one of locking the user account, sending a user a one-time password, or enabling two-factor authentication.

14. The one or more non-transitory computer-readable media of claim 1, wherein the output identifies a predicted attack on the user account within a specified timeframe.

15. The one or more non-transitory computer-readable media of claim 1, wherein the output identifies a predicted attack and severity based on log events associated with online shoppers.

16. The one or more non-transitory computer-readable media of claim 1, wherein the set of features include outlier scores for a location, network address, browser, language, and network provider; wherein the set of features further includes a number of vulnerability scanners, directory traversals, standard query language (SQL) injection attempts, login successes, login failures, blocked addresses, cities in login failures, and countries in login failures within a threshold timeframe.

17. A system comprising:
one or more hardware processors;
one or more non-transitory computer-readable media storing instructions, which, when executed by one or more hardware processors, cause performance of operations comprising:
identifying varying values for a set of features within historical activity associated with a user account for accessing one or more network services;
training, based on the varying values for the set of features, a machine-learning model to predict upcoming network attacks;
detecting activity associated with the user account;
generating, by the machine-learning model based on the detected activity, an output that identifies how many network attacks are predicted to occur up to a future horizon; and
executing, as a function of the output of the machine learning model, a rule that compares how many network attacks are predicted to occur up to the future horizon to a configurable threshold number, wherein executing the rule performs at least one operation to secure the user account responsive, at least in part, to determining that a number of network attacks predicted to occur up to the future horizon exceeds the configurable threshold number.

18. A method comprising:
identifying varying values for a set of features within historical activity associated with a user account for accessing one or more network services;
training, based on the varying values for the set of features, a machine-learning model to predict upcoming network attacks;
detecting activity associated with the user account; and
generating, by the machine-learning model based on the detected activity, an output that identifies how many network attacks are predicted to occur up to a future horizon; and
executing, as a function of the output of the machine learning model, a rule that compares how many network attacks are predicted to occur up to the future horizon to a configurable threshold number, wherein executing the rule performs at least one operation to secure the user account responsive, at least in part, to determining that a number of network attacks predicted to occur up to the future horizon exceeds the configurable threshold number.

19. The one or more non-transitory computer-readable media of claim 12, wherein the rule further compares the predicted probability to a threshold probability, wherein the at least one operation is performed only if the predicted probability satisfies the threshold probability.

20. The one or more non-transitory computer-readable media of claim 1, wherein the configurable threshold number is greater than zero.

* * * * *

UNITED STATES PATENT AND TRADEMARK OFFICE
CERTIFICATE OF CORRECTION

PATENT NO. : 12,368,739 B2
APPLICATION NO. : 17/450801
DATED : July 22, 2025
INVENTOR(S) : Šterba et al.

It is certified that error appears in the above-identified patent and that said Letters Patent is hereby corrected as shown below:

In the Specification

In Column 7, Line 24, delete "attack" and insert -- attack. --, therefor.

In Column 8, Line 42, delete "E=>Σ" and insert -- E=Σ --, therefor.

In Column 11, Line 67, delete "Next15 minutes" and insert -- Next15minutes --, therefor.

In Column 13, Line 12, delete "Next15 minutes" and insert -- Next15minutes --, therefor.

In Column 13, Line 13, delete "Next15 minutes" and insert -- Next15minutes --, therefor.

In Column 15, Line 19, delete "(QOS)" and insert -- (QoS) --, therefor.

In the Claims

In Column 22, Line 41, in Claim 18, delete "account; and" and insert -- account; --, therefor.

Signed and Sealed this
Thirteenth Day of January, 2026

John A. Squires
*Director of the United States Patent and Trademark Office*